US012801307B2

(12) United States Patent
Son et al.

(10) Patent No.: US 12,801,307 B2
(45) Date of Patent: Nov. 17, 2026

(54) STORAGE DEVICE REBUILDING A MAPPING TABLE USING A HOST MEMORY BUFFER AND METHOD OF OPERATION

(71) Applicant: SK hynix Inc., Icheon-si (KR)

(72) Inventors: Min Su Son, Icheon-si (KR); Jung Ho Lee, Icheon-si (KR); Ji Hun Choi, Icheon-si (KR); Soong Sun Shin, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 19/222,639

(22) Filed: May 29, 2025

(65) Prior Publication Data

US 2026/0195067 A1 Jul. 9, 2026

(30) Foreign Application Priority Data

Jan. 6, 2025 (KR) ........................ 10-2025-0001383

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ......................................................... G06F 3/06
See application file for complete search history.

(56) References Cited

U.S. PATENT DOCUMENTS 10,289,321 B1 * 5/2019 Baryudin ................ G06F 3/064
2012/0054419 A1 * 3/2012 Chen ................... G06F 12/0246 711/E12.008
2016/0154594 A1 * 6/2016 Kang .................. G06F 12/0246 711/103
2021/0382828 A1 * 12/2021 Li ....................... G06F 12/1009

FOREIGN PATENT DOCUMENTS

KR 10-2020-0046264 A 5/2020
KR 10-2024-0120985 A 8/2024

* cited by examiner

*Primary Examiner* — Khoa D Doan

(57) ABSTRACT

A storage device may include a memory storing a plurality of map segments included in a mapping table indicating a mapping relationship between a plurality of logical addresses and a plurality of physical addresses, and a plurality of journals, each indicating a change history of the mapping table; and a controller configured to wait for a notification message indicating that a host memory buffer located outside the storage device has been activated after a set target event occurs, load a target map segment among the plurality of map segments into the host memory buffer after receiving the notification message from outside the storage device, update the target map segment loaded into the host memory buffer based on at least one of the plurality of journals, and rebuild the mapping table using the updated target map segment.

14 Claims, 9 Drawing Sheets

STORAGE DEVICE REBUILDING A MAPPING TABLE USING A HOST MEMORY BUFFER AND METHOD OF OPERATION

CROSS-REFERENCE TO RELATED APPLICATION

The present application claims priority under 35 U.S.C. § 119(a) to Korean patent application number 10-2025-0001383 filed in the Korean Intellectual Property Office on Jan. 6, 2025, which is incorporated herein by reference in its entirety.

BACKGROUND

1. Technical Field

Embodiments of the present disclosure relate to a storage device that rebuilds a mapping table using a host memory buffer and a method of operation.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory included in the storage device according to the received command.

The storage device can store a mapping table in memory that indicates a mapping relationship between a plurality of logical addresses and a plurality of physical addresses. The mapping table can be used to search for a physical address of data corresponding to a specific logical address during a read operation, and to record a physical address where data corresponding to a specific logical address is written during a write operation.

The storage device can perform operations of re-reading information that was not reflected in the mapping table when a specific event occurs and then rebuilding the mapping table.

SUMMARY

Embodiments of the present disclosure may provide a storage device, which can shorten the rebuild time of a mapping table and increase the lifespan of the storage device by updating a map segment required for rebuilding the mapping table using a host memory buffer, and an operation method thereof.

Objects of embodiments of the disclosure are not limited to those set forth herein, and other objects not mentioned would be apparent to one of ordinary skill in the art from the following description.

Embodiments of the present disclosure may provide a storage device including: a memory storing a plurality of map segments included in a mapping table that indicates a mapping relationship between a plurality of logical addresses and a plurality of physical addresses, and a plurality of journals, indicating a change history of the mapping table; and a controller, wherein the controller receives a notification message indicating that a host memory buffer located outside the storage device has been activated after a target event occurs, wherein the controller loads a target map segment, from among the plurality of map segments, into the host memory buffer after receiving the notification message from outside the storage device, wherein the controller updates the target map segment loaded into the host memory buffer based on at least one of the plurality of journals, and wherein the controller rebuilds the mapping table using the updated target map segment.

Embodiments of the present disclosure may provide a method of operating a storage device including: detecting an occurrence of a set target event; after the set target event occurs, receiving a notification message indicating that a host memory buffer located outside the storage device has been activated; after receiving the notification message, loading a target map segment included in a mapping table that indicates a mapping relationship between a plurality of logical addresses and a plurality of physical addresses, from a memory storing the target map segment, into the host memory buffer; and updating the target map segment loaded into the host memory buffer using one or more journals indicating a change history of the mapping table; and rebuilding the mapping table using the updated target map segment.

Embodiments of the present disclosure may provide a storage device including: a memory storing a plurality of map segments included in a mapping table that indicates a mapping relationship between a plurality of logical addresses and a plurality of physical addresses, and a plurality of journals each indicating a change history of the mapping table; and a controller wherein the controller loads a target map segment, from among a plurality of map segments, into a host memory buffer at a time point after a preset waiting time has elapsed following an occurrence of a set target event, wherein the controller updates the target map segment loaded into the host memory buffer based on one or more of the plurality of journals, and wherein the controller rebuilds the mapping table using the updated target map segment.

The effects of the disclosure are not limited to the foregoing objects, and other effects will be apparent to one of ordinary skill in the art from the following detailed description.

BRIEF DESCRIPTION OF THE DRAWINGS

The disclosure will be more fully understood from the following detailed description and the accompanying drawings, which are provided for illustration only and are not intended to limit the disclosure.

DETAIL DESCRIPTION

Figure 1:
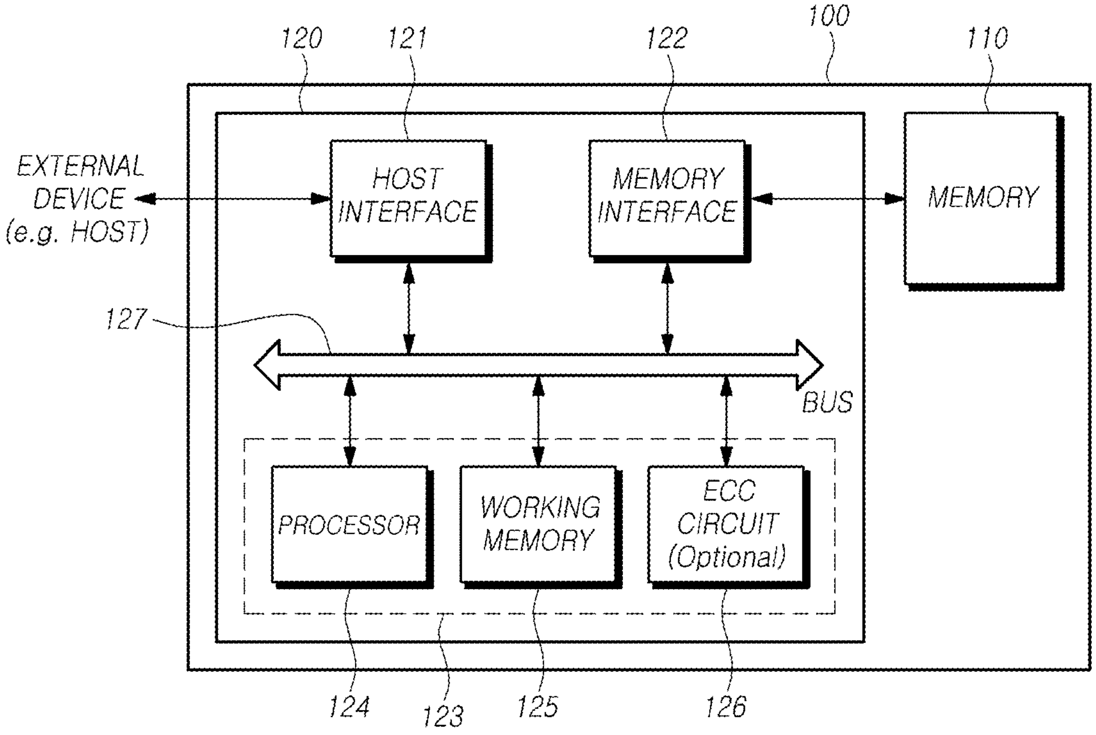
FIG. 1 is a schematic configuration diagram of a storage device according to an embodiment of the present disclosure.

Hereinafter, embodiments of the present disclosure are described in detail with reference to the accompanying drawings. When assigning reference numerals to components in each drawing, the same components may be assigned the same numerals even when they are shown on different drawings. When determined to make the subject matter of the disclosure unclear, details of the known art or functions may be omitted. As used herein, when a component "includes," "has," or "is composed of" another component, the component may add other components unless the component "only" includes, has, or is composed of the other component. As used herein, the singular forms "a", "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components is not limited by the denotations.

In describing the positional relationship between components, when two or more components are described as "connected", "coupled" or "linked", the two or more components may be directly "connected", "coupled" or "linked"", or another component may intervene. Here, the other component may be included in one or more of the two or more components that are "connected", "coupled" or "linked" to each other.

When such terms as, e.g., "after", "next", "after", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer, which performs a translating function between a logical address requested to the storage device 100 from the host and a physical address of the memory 110; a host interface layer (HIL), which serves to analyze a command requested to the storage device 100 as a storage device from the host and transfer the command to the flash translation layer; and a flash interface layer (FIL), which transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is higher than a reference value, the error detection and correction circuit 126 may determine that a corresponding sector is uncorrectable or a fail. On the other hand, when a bit error rate is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
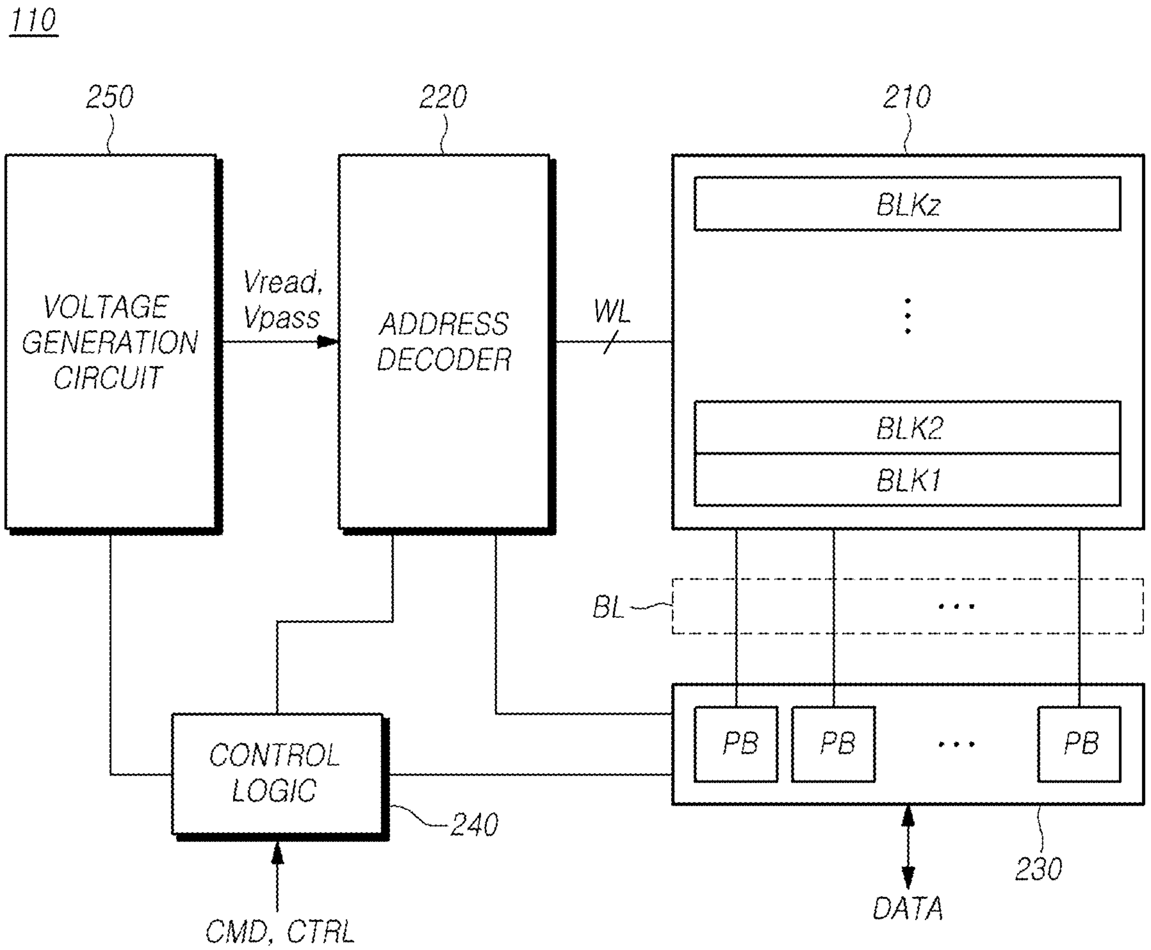
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
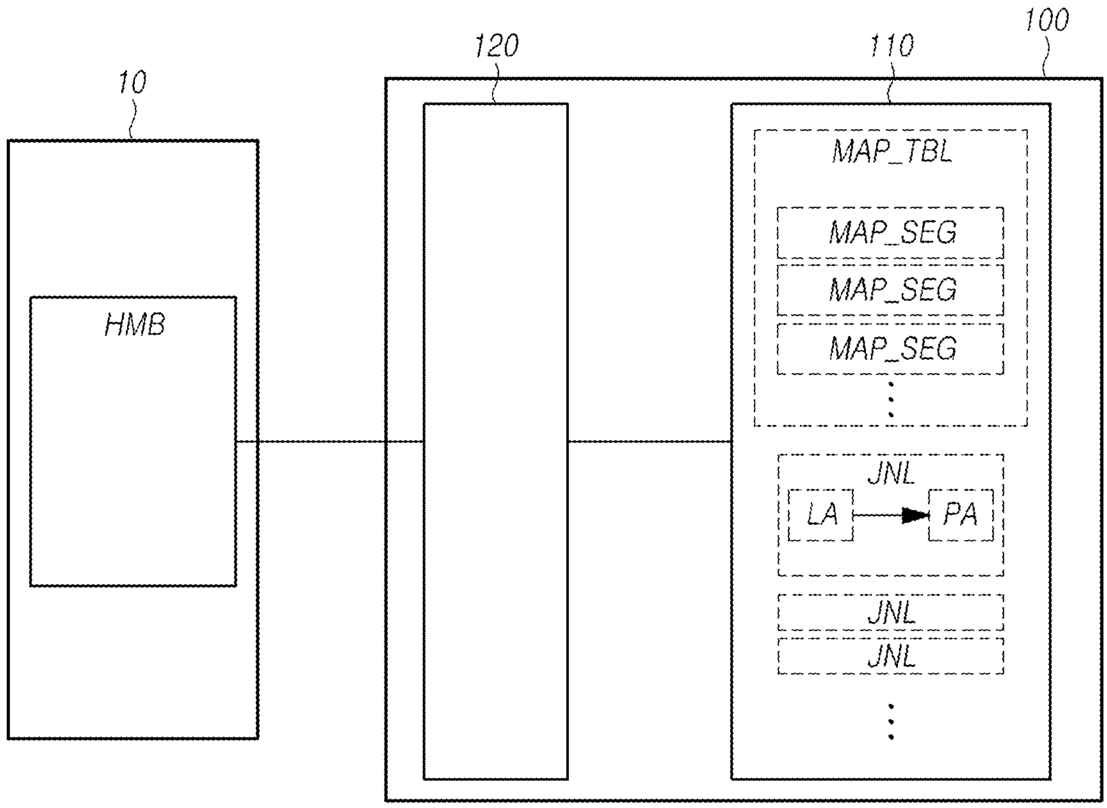
FIG. 3 is a schematic configuration diagram of a storage device according to an embodiment of the present disclosure.

FIG. 3 is a schematic configuration diagram of a storage device according to an embodiment of the present disclosure.

Referring to FIG. 3, a storage device 100 may include a memory 110 and a controller 120.

The memory 110 may store a mapping table MAP_TBL and a plurality of journals JNL.

The mapping table MAP_TBL may indicate a mapping relationship between a plurality of logical addresses and a plurality of physical addresses.

The mapping table MAP_TBL may include a plurality of map segments MAP_SEG. The map segment may also be referred to as a map slice, a map chunk, etc.

Each map segment may include a plurality of mapping information units. Each mapping information unit may indicate a physical address or another map segment that is mapped to a specific logical address. The logical address may correspond to the start address of the logical address area of a fixed size (e.g., page size), and the physical address may correspond to the start address of the physical address area of a fixed size.

The plurality of journals JNL may each indicate the change history of the mapping table MAP_TBL. For example, each journal may include information on a specific logical address LA and a newly mapped physical address PA for that information.

In an embodiment according to the present disclosure, the controller 120 may rebuild the mapping table MAP_TBL using a host memory buffer HMB located outside the storage device 100 when a set target event occurs.

The host memory buffer HMB may be included in an external device 10, which may be a host. The external device 10 may allocate a part of the memory area of the external device 10 to the storage device 100, and the allocated memory area may be referred to as a host memory buffer HMB.

The storage device 100 may store data in the allocated host memory buffer HMB and may read data stored in the host memory buffer HMB.

As an example, the storage device 100 may store one or more of the aforementioned multiple map segments MAP_SEG in the host memory buffer HMB. As another example, the storage device 100 may store, in the host memory buffer HMB, management data for managing or controlling the storage device 100. As another example, the storage device 100 may temporarily store, in the host memory buffer HMB, user data to be written into the memory 110.

The host memory buffer HMB may be located in a volatile memory or a non-volatile memory included in the external device 10.

Hereinafter an operation of a storage device 100 is described in detail in FIG. 4.

Figure 4:
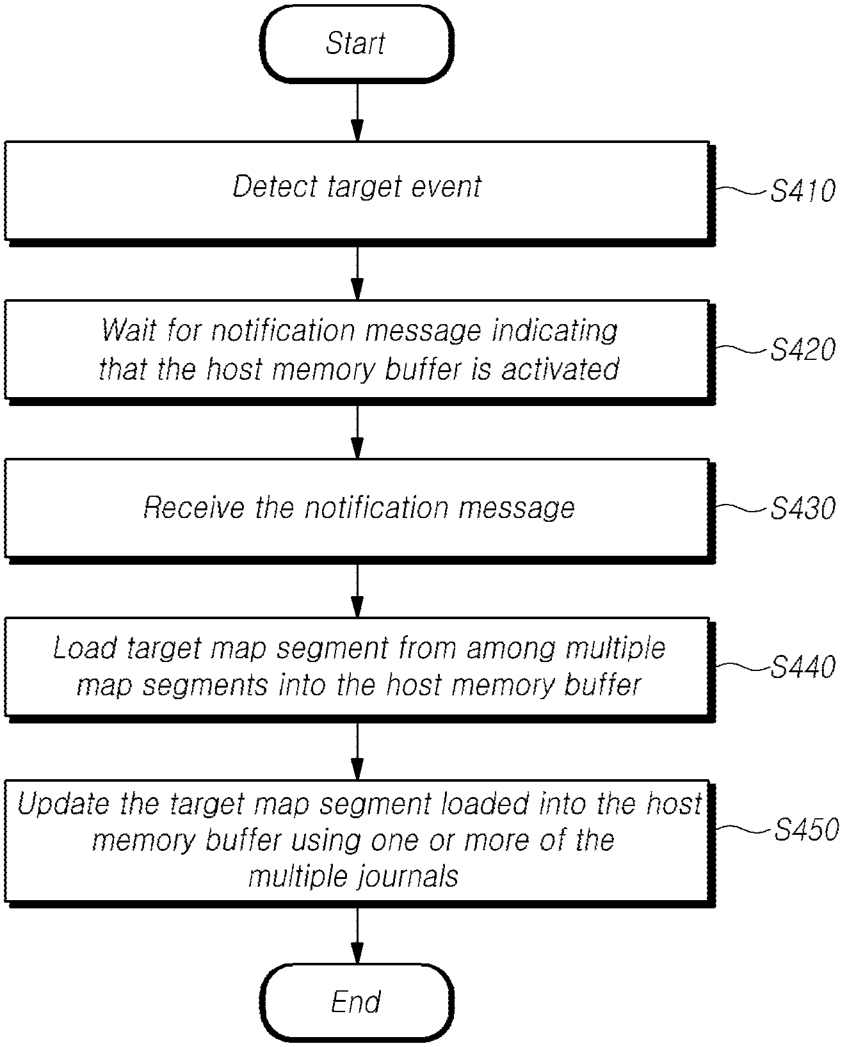
FIG. 4 is a flowchart illustrating an operation of a storage device according to an embodiment of the present disclosure.

FIG. 4 is a flowchart illustrating an operation of a storage device according to an embodiment of the present disclosure.

Referring to FIG. 4, a controller 120 of a storage device 100 can detect a set target event (S410).

For example, the target event may be an event indicating that a sudden power off (SPO) has occurred or that a host memory buffer HMB is deactivated.

Further the controller 120 may wait for a notification message indicating that the host memory buffer HMB has been activated after the target event occurs (S420). The notification message may be transmitted from an external device 10, in which the host memory buffer HMB is located. The notification message may be transmitted in the form of a command or a specific electrical signal etc.

In embodiments according to the present disclosure, the controller 120 does not perform a rebuild operation on the mapping table MAP_TBL until the notification message is received.

The controller 120 may receive, however, activation information for the host memory buffer HMB from the external device 10 before the target event occurs. The activation information for the host memory buffer HMB may indicate that the external device 10 uses the host memory buffer HMB and that the host memory buffer HMB has been allocated to the storage device 100. In addition, the activation information may instruct the storage device 100 to wait for the activation of the host memory buffer HMB after the target event occurs.

The controller 120 may wait for a notification message after the target event occurs only if it has received activation information before the target event occurs. However, if the controller 120 does not receive the above described activation information, then it does not use the host memory buffer HMB when performing a rebuild operation for the mapping table MAP_TBL after a target event occurs.

Further, the controller 120 may receive a notification message from outside the storage device 100 (S430), and then may load a target map segment, from among a plurality of map segments MAP_SEG included in the mapping table MAP_TBL, into the host memory buffer HMB (S440).

Since the controller 120 can detect that a host memory buffer HMB is available through the received notification message, it may load the target map segment into the host memory buffer HMB after receiving the notification message.

The controller 120 needs to update the target map segment loaded into the host memory buffer HMB in order to rebuild the mapping table MAP_TBL after the target event occurs. However, if there is insufficient memory inside the controller 120 to store the entire target map segment (e.g., if the controller 120 does not include DRAM), then the process of partially loading, updating and then writing the target map segment to the mapping table MAP_TBL again must be repeatedly performed.

In addition, the size of data written to the memory 110 increases. This extends the overall rebuild time of the mapping table MAP_TBL, and also reduces the lifespan of the storage device 100 due to the increased number of write operations. Since the number of write operations can affect the lifespan and reliability of the storage device 100, it is desirable to minimize the number of write operations as much as possible.

Accordingly, the controller 120 may load the target map segment into the host memory buffer HMB, to which sufficient space is allocated to load the entire target map segment. The controller updates the target map segment loaded into the host memory buffer HMB. As a result, the controller 120 may shorten the time required to rebuild the mapping table MAP_TBL and increase the lifespan of the storage device 100.

Further, the controller 120 may update the target map segment loaded into the host memory buffer HMB using one or more of the multiple journals JNL stored in a memory 110 (S450). The operation of updating the target map segment using a journal may be called a replay operation.

After updating, the target map segment loaded into the host memory buffer HMB may be used to rebuild the mapping table MAP_TBL.

FIG. 4. Illustrates an operation in which the controller 120 wait for a notification message. In other embodiments, the controller 120 does not wait for a notification message and instead rebuilds the mapping table MAP_TBL using the host memory buffer HMB at a point in time after a preset target event has occurred and a preset waiting time has elapsed.

The controller 120 may determine a preset waiting time based on the history of the host memory buffer HMB when activated after previous occurrences of a target event. For example, if there is a record of the host sending a notification message within 0.1 seconds after the power is turned off/on, then the controller 120 may rebuild the mapping table MAP_TBL using the host memory buffer HMB immediately after the waiting time (e.g., 0.2 seconds) has elapsed and without waiting to receive the notification message.

In this embodiment, the controller 120, without receiving the notification message from the host, may load the target map segment into the host memory buffer HMB, update the target map segment based on one or more of the multiple journals JNL, and rebuild the mapping table MAP_TBL using the updated target map segment.

Figure 5:
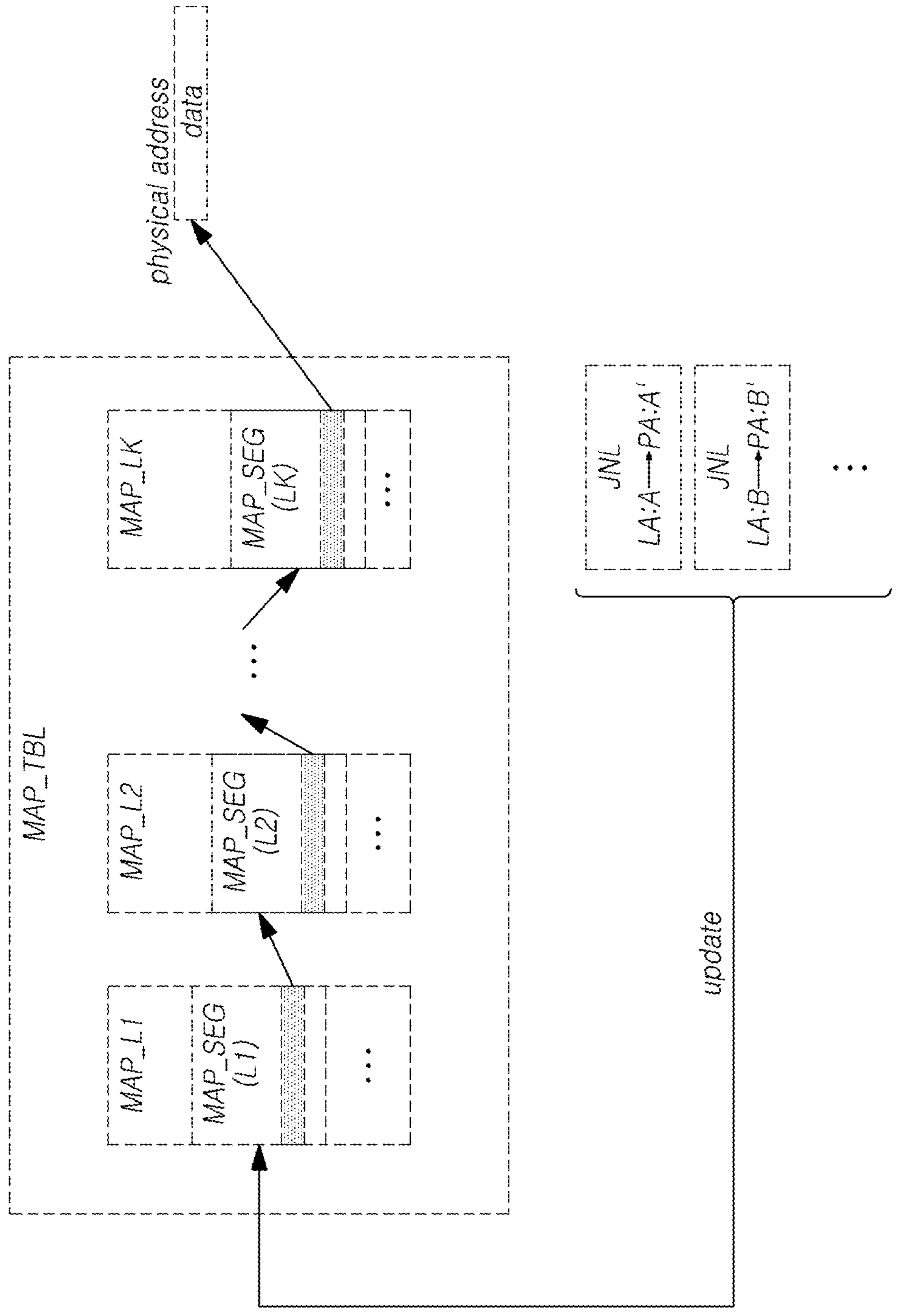
FIG. 5 shows an example of an operation of a storage device to update a mapping table according to an embodiment of the present disclosure.

FIG. 5 shows an example operation of a storage device to update a mapping table according to an embodiment of the present disclosure.

Referring to FIG. 5, a mapping table MAP_TBL may include a K (where K is a natural number) number of layers MAP_L1, MAP_L2, . . . , MAP_LK, and each layer may include one or more map segments MAP_SEG.

As an example, the mapping table MAP_TBL may include a single layer. In this case, all map segments MAP_SEG may be located in the same layer.

As another example, the mapping table MAP_TBL may include multiple layers. In this case, the mapping information unit of the map segment included in a Kth layer may indicate a specific physical address area where data is stored, and the mapping information unit of map segments included in 1st to (K−1)th layers may indicate other map segments included in different layers.

The controller 120 may use one or more journals JNL to update the mapping table MAP_TBL.

As described above, a plurality of journals JNL may each indicate the change history of the mapping table MAP_TBL. In FIG. 5, one of the plurality of journals JNL may indicate that the physical address mapped to logical address A has changed to A', and another may indicate that the physical address mapped to logical address B has changed to B'.

The controller 120 may sequentially search for the map segment corresponding to each journal in the K layers MAP_L1, MAP_L2, . . . , MAP_LK and may execute an update operation for the searched map segment. The map segment to be updated may be the target map segment.

For example, the controller 120 may search for a map segment corresponding to the journal in the i-th layer (where i is a natural number less than or equal to K) among K layers, and update the searched map segment using the journal. The map segment corresponding to the journal may include a mapping information unit corresponding to a logical address recorded in the journal.

Hereinafter, a specific operation of the controller 120 of the storage device 100 updating a target map segment using a journal will be described.

Figure 6:
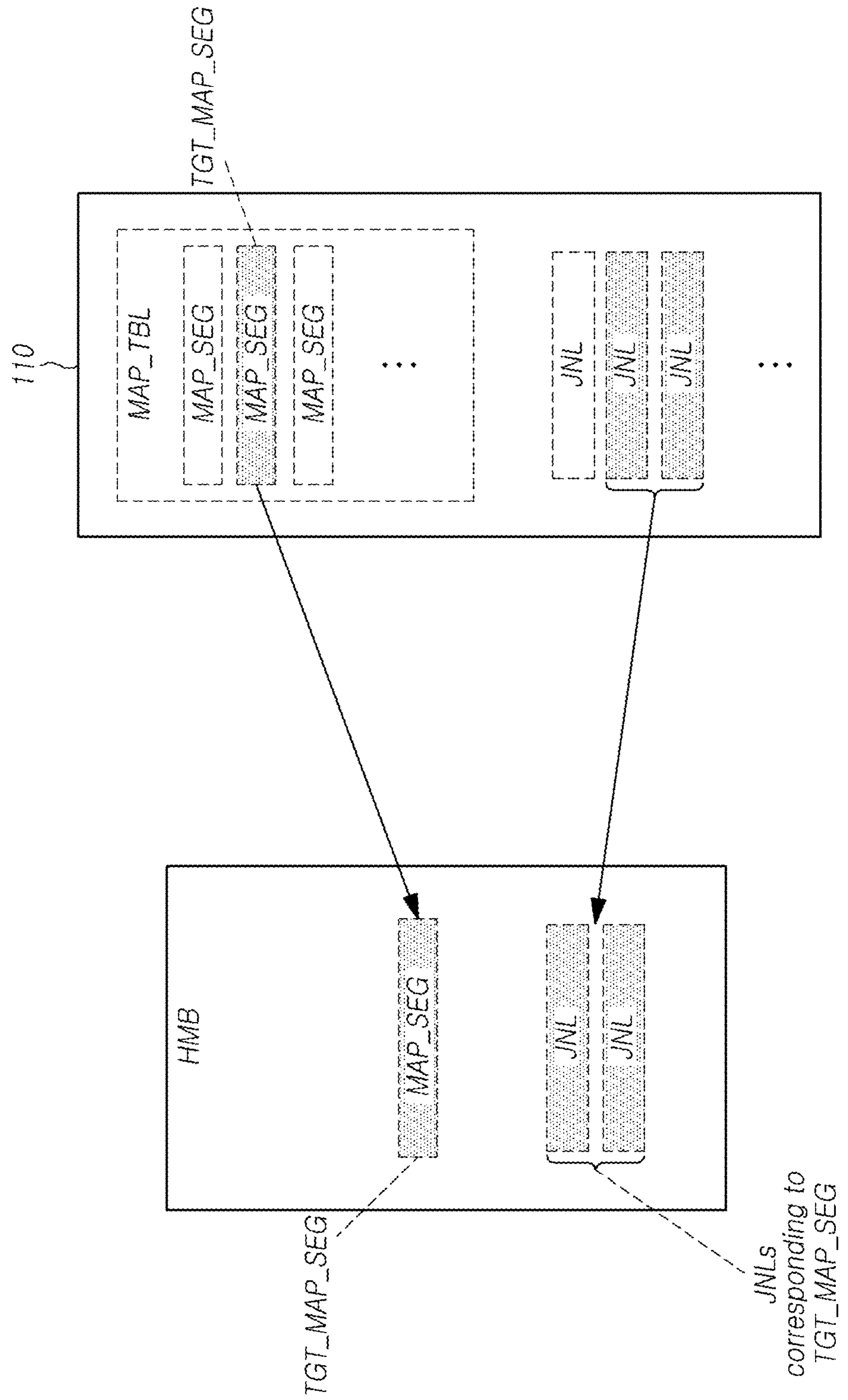
FIG. 6 illustrates an operation of a storage device to load a target map segment and a journal into a host memory buffer according to an embodiment of the present disclosure.

FIG. 6 illustrates an operation of a storage device according to an embodiment of the present disclosure.

Referring to FIG. 6, a controller 120 of a storage device 100 may load a target map segment TGT_MAP_SEG into a host memory buffer HMB, and also load, into the host memory buffer HMB, a journal corresponding to the target map segment TGT_MAP_SEG, from among multiple journals JNL in a memory 110.

By loading a journal corresponding to the target map segment TGT_MAP_SEG together into the host memory buffer HMB, the controller 120 may more quickly reflect the change history, which is indicated by the journal corresponding to the target map segment TGT_MAP_SEG, in a revision to the target map segment TGT_MAP_SEG loaded in the host memory buffer HMB.

Figure 7:
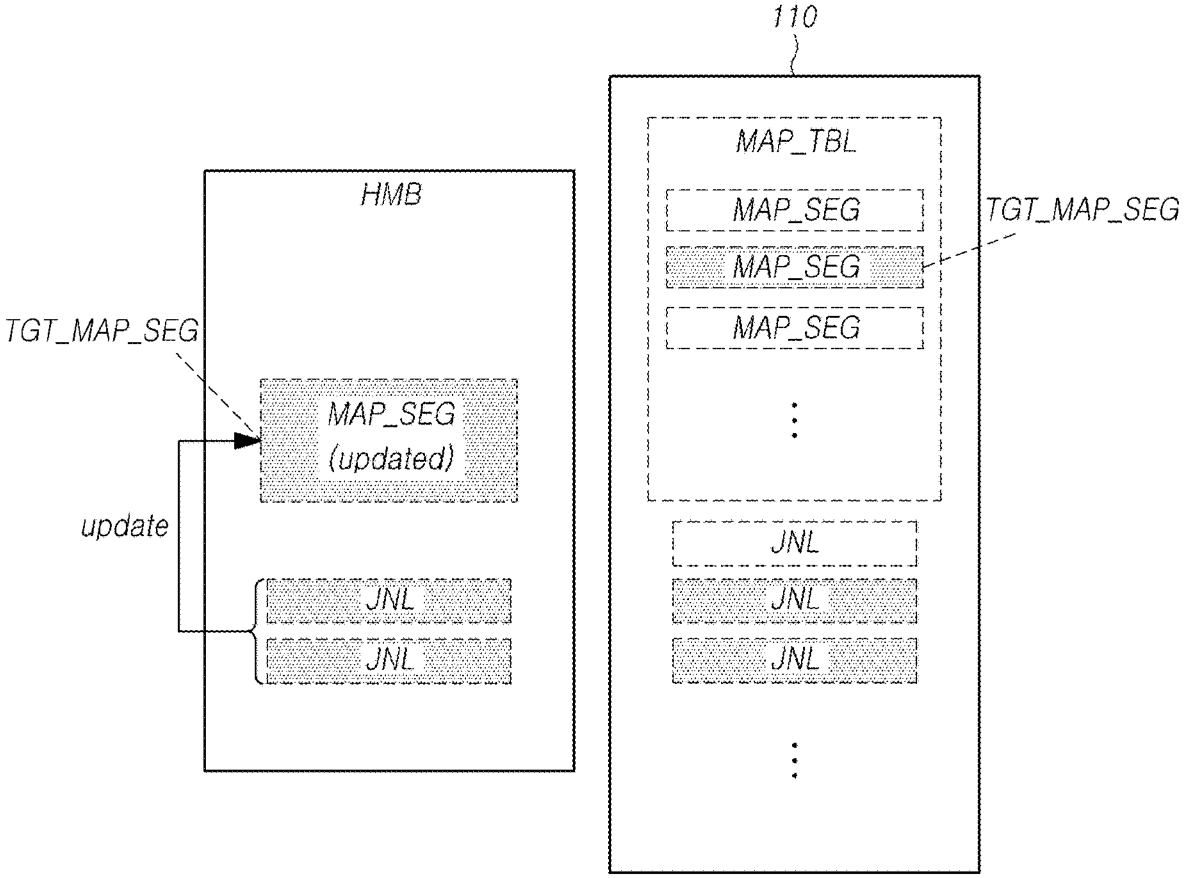
FIG. 7 illustrates an operation of a storage device to update a target map segment loaded into a host memory buffer according to an embodiment of the present disclosure.

FIG. 7 illustrates an operation of a storage device to update a target map segment loaded into a host memory buffer according to an embodiment of the present disclosure.

Referring to FIG. 7, a controller 120 of a storage device 100 may update a target map segment TGT_MAP_SEG loaded in a host memory buffer HMB according to the change history indicated by a journal loaded in the host memory buffer HMB.

For example, the controller 120 may search for a mapping information unit of a map segment corresponding to a logical address included in the journal loaded into the host memory buffer HMB, and update the map segment by modifying the mapping information unit so that the physical address area or map segment indicated by the searched mapping information unit corresponds to the physical address included in the journal.

Figure 8:
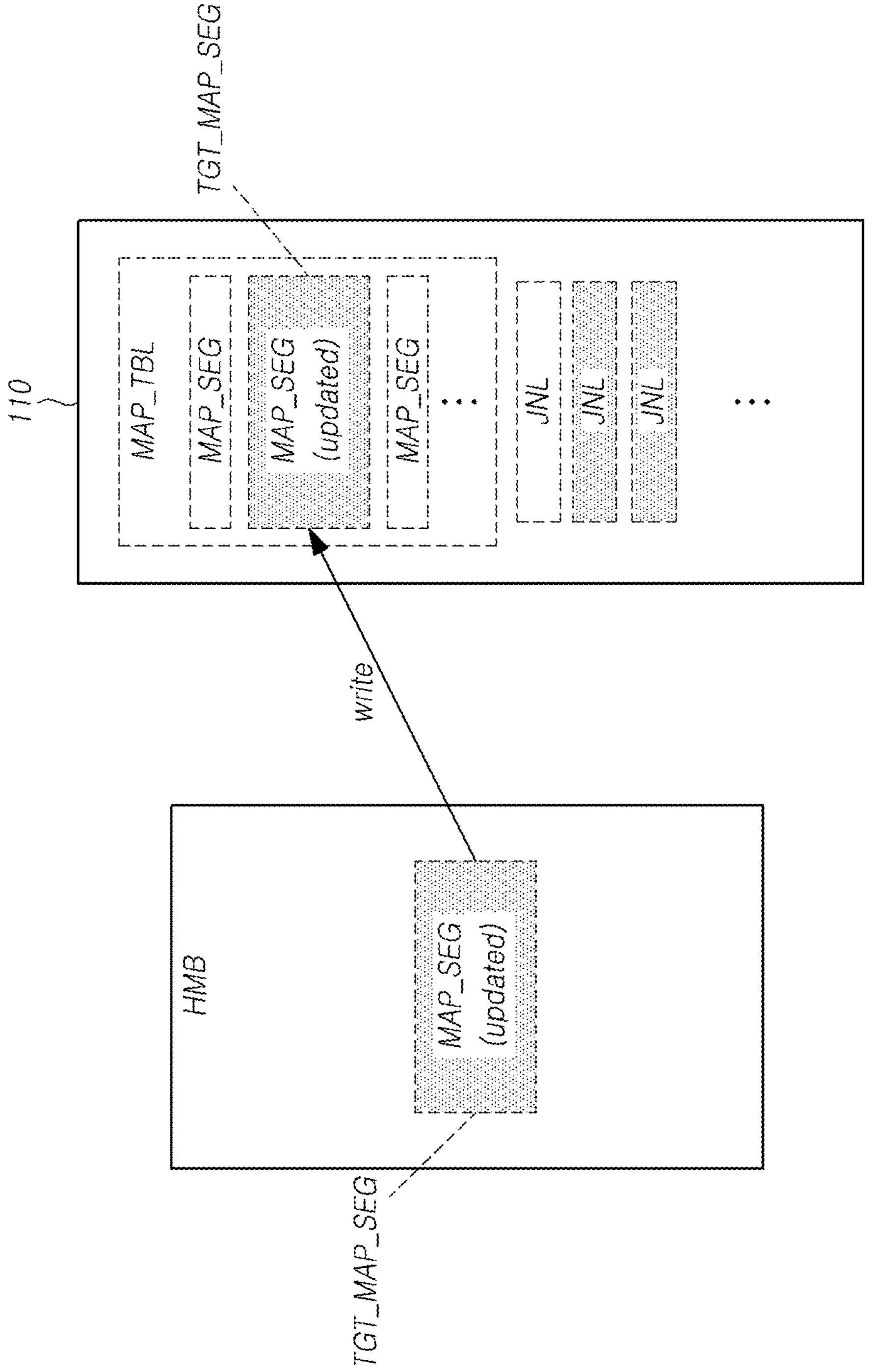
FIG. 8 illustrates an operation of a storage device to write an updated target map segment into memory according to an embodiment of the present disclosure.

FIG. 8 illustrates an operation of a storage device to write an updated target map segment into memory according to an embodiment of the present disclosure.

Referring to FIG. 8, a controller 120 of a storage device 100 may write a target map segment TGT_MAP_SEG loaded into a host memory buffer HMB into a memory 110 after an operation of updating the target map segment TGT_MAP_SEG is completed.

The controller 120 may delete the existing target map segment TGT_MAP_SEG stored in the mapping table MAP_TBL and may replace it with the updated target map segment TGT_MAP_SEG that is loaded in the host memory buffer HMB.

Figure 9:
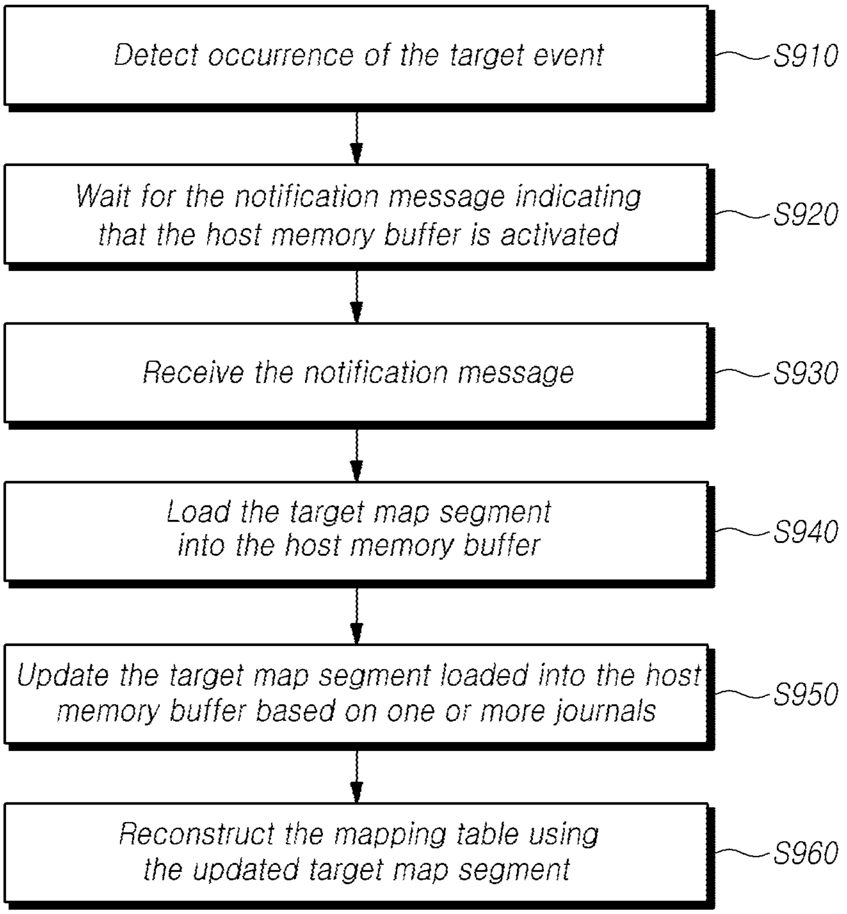
FIG. 9 shows an operation method of a storage device according to an embodiment of the present disclosure.

FIG. 9 illustrates an operation method of a storage device according to an embodiment of the present disclosure.

Referring to FIG. 9, an operation method of a storage device 100 may include a step (S910) of detecting an occurrence of a set target event.

As an example, the target event may be a sudden power off (SPO) or an event indicating the deactivation of a host memory buffer HMB.

Further, the operation method of the storage device 100 may include a step (S920) of waiting for a notification message indicating that a host memory buffer HMB located outside the storage device 100 has been activated after a target event occurs.

The operation method of the storage device 100 may additionally include receiving activation information about a host memory buffer HMB from outside the storage device 100 before a target event occurs (not illustrated). The activation information may instruct the storage device 100 to wait for the activation of the host memory buffer HMB after the host memory buffer HMB has been allocated to the storage device 100 and after the target event occurs.

Further, the operation method of the storage device 100 may include a step (S930) of receiving a notification message from outside of the storage device 100.

Further, the operation method of the storage device 100 may include a step (S940) of loading the target map segment TGT_MAP_SEG included in the mapping table MAP_TBL, from the memory 110 to the host memory buffer HMB, after receiving a notification message.

Further, the operation method of the storage device 100 may include a step (S950) of updating the target map segment TGT_MAP_SEG loaded into the host memory buffer HMB using one or more journals JNL indicating a change history for the mapping table MAP_TBL.

As an example, step S950 may load one or more journals JNL into the host memory buffer HMB. During step S950, the target map segment TGT_MAP_SEG loaded into the host memory buffer HMB may be updated according to the change history indicated by the journal, which is also loaded into the host memory buffer HMB.

Further, the operation method of the storage device 100 may include a step (S960) of rebuilding the mapping table MAP_TBL using the target map segment TGT_MAP_SEG updated in step S950.

Although exemplary embodiments of the present disclosure have been described for illustrative purposes, those skilled in the art will appreciate that various modifications, additions and substitutions are possible without departing from the scope and spirit of the disclosure. Therefore, the embodiments disclosed above and in the accompanying drawings should be considered descriptive rather than restrictive. The technological scope of the disclosure is not limited by the embodiments and the accompanying drawings. The spirit and scope of the disclosure should be interpreted in connection with the appended claims and encompass all equivalents that fall within the scope of the appended claims.

What is claimed is:

1. A storage device, comprising:

a memory storing a plurality of map segments included in a mapping table indicating a mapping relationship between a plurality of logical addresses and a plurality of physical addresses, and a plurality of journals indicating a change history of the mapping table; and a controller;

wherein the controller receives a notification message indicating that a host memory buffer located outside the storage device has been activated after a target event occurs, wherein the controller loads a target map segment, from among the plurality of map segments, into the host memory buffer after receiving the notification message from outside the storage device, wherein the controller updates the target map segment loaded into the host memory buffer based on at least one of the plurality of journals, and wherein the controller rebuilds the mapping table using the updated target map segment.

2. The storage device according to claim 1, wherein the target event is an event indicating that a sudden power off has occurred or that the host memory buffer has been deactivated.

3. The storage device according to claim 1, wherein the controller receives activation information for the host memory buffer from outside the storage device before the target event occurs, and wherein the activation information instructs the storage device to wait for activation of the host memory buffer after the host memory buffer is allocated to the storage device and the target event occurs.

4. The storage device according to claim 1, wherein the controller loads a journal corresponding to the target map segment into the host memory buffer.

5. The storage device according to claim 4, wherein the controller updates the target map segment loaded into the host memory buffer according to the change history indicated by the journal loaded into the host memory buffer.

6. The storage device according to claim 1, wherein the controller writes the updated target map segment loaded into the host memory buffer into the memory.

7. A method of operating a storage device comprising:

detecting an occurrence of a set target event;

after the set target event occurs, receiving a notification message indicating that a host memory buffer located outside the storage device has been activated;

after receiving the notification message, loading a target map segment, included in a mapping table indicating a mapping relationship between a plurality of logical addresses and a plurality of physical addresses, from a memory where the target map segment is stored into the host memory buffer;

updating the target map segment loaded into the host memory buffer using one or more journals indicating a change history of the mapping table; and rebuilding the mapping table using the updated target map segment.

8. The method of operating a storage device according to claim 7, wherein the set target event is an event indicating a sudden power off or a deactivation of the host memory buffer.

9. The method of operating a storage device according to claim 7, further comprising receiving activation information for the host memory buffer from outside the storage device before the set target event occurs, wherein the activation information instructs the storage device to wait for activation of the host memory buffer after the host memory buffer is allocated to the storage device and the set target event occurs.

10. The method of operating a storage device according to claim 7, wherein the step of updating the target map segment further comprises loading a journal corresponding the target map segment into the host memory buffer.

11. The method of operating a storage device according to claim 10, wherein the step of updating the target map segment further comprises updating the target map segment loaded into the host memory buffer according to a change history indicated by the journal loaded into the host memory buffer.

12. A storage device comprising:

a memory that stores a plurality of map segments included in a mapping table indicating a mapping relationship between a plurality of logical addresses and a plurality of physical addresses, and a plurality of journals, each indicating a change history of the mapping table; and a controller;

wherein the controller loads a target map segment, from among the plurality of map segments, into a host memory buffer at a time point after a preset waiting time has elapsed following an occurrence of a target event, wherein the controller updates the target map segment loaded into the host memory buffer based on one or more of the plurality of journals, and wherein the controller rebuilds the mapping table using the updated target map segment.

13. The storage device according to claim 12, wherein the target event is an event indicating that a sudden power off (SPO) has occurred or the host memory buffer has been deactivated.

14. The storage device according to claim 12, wherein the controller receives activation information for the host memory buffer from outside the storage device before the target event occurs, and wherein the activation information instructs the storage device to wait for activation of the host memory buffer after the host memory buffer is allocated to the storage device, and after the target event occurs.

* * * * *